US006349746B1

(12) United States Patent
Bergemann et al.

(10) Patent No.: US 6,349,746 B1
(45) Date of Patent: Feb. 26, 2002

(54) ACTUATING MEANS

(75) Inventors: Dieter Bergemann, Filderstadt; Bernd Lorenz, Reichenbach; Axel Thallemer, Esslingen, all of (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/700,965

(22) PCT Filed: Mar. 4, 2000

(86) PCT No.: PCT/EP00/01915

§ 371 Date: Nov. 21, 2000

§ 102(e) Date: Nov. 21, 2000

(87) PCT Pub. No.: WO00/61952

PCT Pub. Date: Oct. 19, 2000

(30) Foreign Application Priority Data

Apr. 14, 1999 (DE) .................................... 299 06 626 U

(51) Int. Cl.[7] ................................................ F16L 55/12
(52) U.S. Cl. ........................................ 138/123; 138/93
(58) Field of Search ................................ 138/123–126, 138/93; 277/605

(56) References Cited

U.S. PATENT DOCUMENTS 2,870,619 A * 1/1959 Greczin .................. 138/123 X
3,567,562 A * 3/1971 Gordon et al. .......... 138/123 X
3,830,519 A * 8/1974 Lewis .................... 138/123 X
4,228,824 A * 10/1980 Evans et al. ............ 138/123 X
4,467,835 A * 8/1984 Champleboux .............. 138/93
4,467,836 A * 8/1984 Ragout ........................ 138/93
4,614,206 A * 9/1986 Mathison et al. ............. 138/93
5,176,660 A * 1/1993 Truckai .................. 138/123 X
6,053,210 A * 4/2000 Chapman et al. ....... 138/123 X

FOREIGN PATENT DOCUMENTS

EP 0 161 750 A 11/1985
WO WO 89/11381 11/1989

OTHER PUBLICATIONS

Patent Abstracts of Japan, Publication No. 60139904, Nov. 21, 1985.
Patent Abstracts of Japan, Publication No. 58081205, May 16, 1983.

* cited by examiner

*Primary Examiner*—Patrick Brinson
(74) *Attorney, Agent, or Firm*—Hoffmann & Baron, LLP

(57) ABSTRACT

It is a question of an actuating means adapted to be activated by fluid power, which comprises a hose body (5) extending between two spaced head pieces (3 and 4) and whose interior space is able to be subjected to a fluid medium. A strand structure (6) fixed to both head pieces (3 and 4) and extending coaxially in relation to the hose body has two strand groups (18 and 19) in a crossover configuration with bendingly flexible strands (7) extending adjacent to one another with the same longitudinal alignment within a strand group. An intermediately placed yielding material (22) between the strand groups (18 and 19) serves to maintain the strand groups constantly at a distance apart.

9 Claims, 2 Drawing Sheets

ACTUATING MEANS

FIELD OF THE INVENTION

The invention relates to an actuating means able to be activated by fluid power, comprising a hose body extending between two spaced head pieces and whose interior space is able to be subjected to a fluid medium, and a strand structure fixed to both head pieces and extending coaxially in relation to the hose body, such strand structure being composed of two strand groups in a crossover configuration with bendingly flexible strands extending adjacent to one another with the same longitudinal alignment within a strand group.

BACKGROUND OF THE INVENTION

An actuating means of this type is disclosed in the European patent publication 0 161 0750 B1. In this known design the hose body consisting of bendingly flexible material is externally surrounded by strand structure consisting of fiber material, which is made up of two strand groups, which assume a crossover configuration in relation to one another. In this case the strand groups are plaited together so that there is a knot-free cross linking effect. Under the action of pressure in its interior space the hose body expands radially, something which owing to cooperation with the strand structure leads to a reduction of the distance between the two head pieces. One problem with the known actuating means is the high friction occurring in the crossover region of the individual strands during a change in diameter of the hose body. This is more particularly caused by changes in angle between the strands of the two strand group. In the case of the said European patent publication 0 161 0750 B1 there is consequently a suggestion to apply a lubricant to the points of intersection of the strands of the individual strand groups. Apart from the work of applying such lubricant there is however also the chance of lubricant evaporating in the course of time or, in the case of the lubricant being a solid coating, gradually being scraped off so that the lubricating effect will decrease as time goes by and friction-dependent damage may occur on the strand structure.

OBJECT AND SUMMARY OF THE INVENTION

Accordingly one object of the present invention is to create an actuating means of this type whose strand structure is hardly subject to wear even in the case of prolonged periods of operation.

In order to achieve this object there is the provision such that an intermediately placed yielding material between the strand groups serves to maintain the stand groups constantly at a distance apart.

It is in this manner that direct contact between the two strand groups is prevented. The necessary distance apart is ensured by a material placed between the strand groups, which practically assumes the function of a partition wall, but which however owing to its yielding properties does not disadvantageously influence the freedom to move of the strands. Owing to the avoidance of direct contact between the strand groups the load on the strand material is substantially reduced and simultaneously the efficiency of the actuating means is improved.

Advantageous further developments of the invention will appear from the dependent claims.

The strand groups are preferably embedded in a flexible and more particularly rubber elastic material, the strand groups being preferably completely surrounded by this material, this meaning at the same time a protection against external effects.

It would in principle be possible to manufacture the strand structure separately from the hose body and to place it as a sort of concentric casing around the hose body. However it is substantially simpler and cheaper to have a design in the case of which the material holding the strand groups at the distance apart is directly constituted by the hose body, that is to say the strand structure is integrated in the material of the hose body, which thus, in addition to its sealing function for the interior space receiving the fluid under pressure, simultaneously assumes the spacing function for the strand groups. It would be feasible as well for instance for the material of the hose body material to be held in a suitable manner in the peripheral portion of the strand groups by vulcanization.

It is furthermore an advantage for the strands to extend within the individual groups thereof without making contact with one another, the material holding the strand groups apart simultaneously being able to serve as a means preventing contact between the strands within the individual groups.

In the case of a particularly convenient design there is a provision such that the strand groups are not cross linked with each other and surround one another coaxially. This renders possible, on the one hand, an extremely simple laying of the strands without complex plaiting. On the other hand the two strand groups run in two mutually concentric tubular layers, which do not penetrate one another radially so that the individual strands have a wave-free form which is stretched out in their principal direction, this meaning a reduction in loads on the material and an improvement in the response characteristic.

In the following the invention will be described in detail with reference to the drawings.

DETAILED DESCRIPTION OF THE PREFERRED EMBODIMENTS

Figure 1:
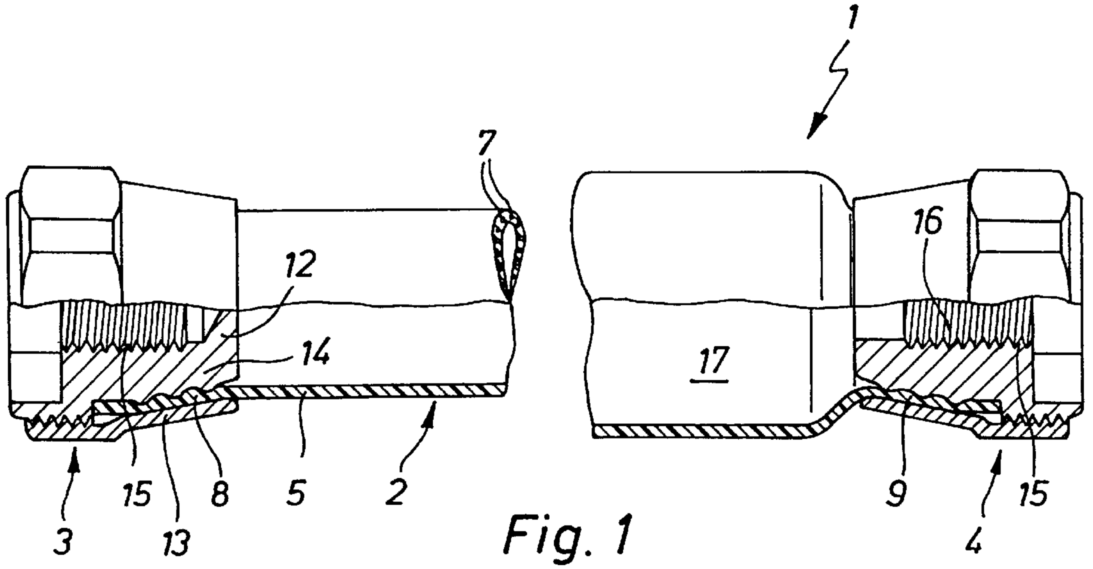
FIG. 1 shows an embodiment of the actuating means in accordance with the invention in a lateral elevation and partially in longitudinal section, the left hand half of the figure showing a non activated and the right hand half of the figure showing an activated operational state of the actuating means.
Figure 2:
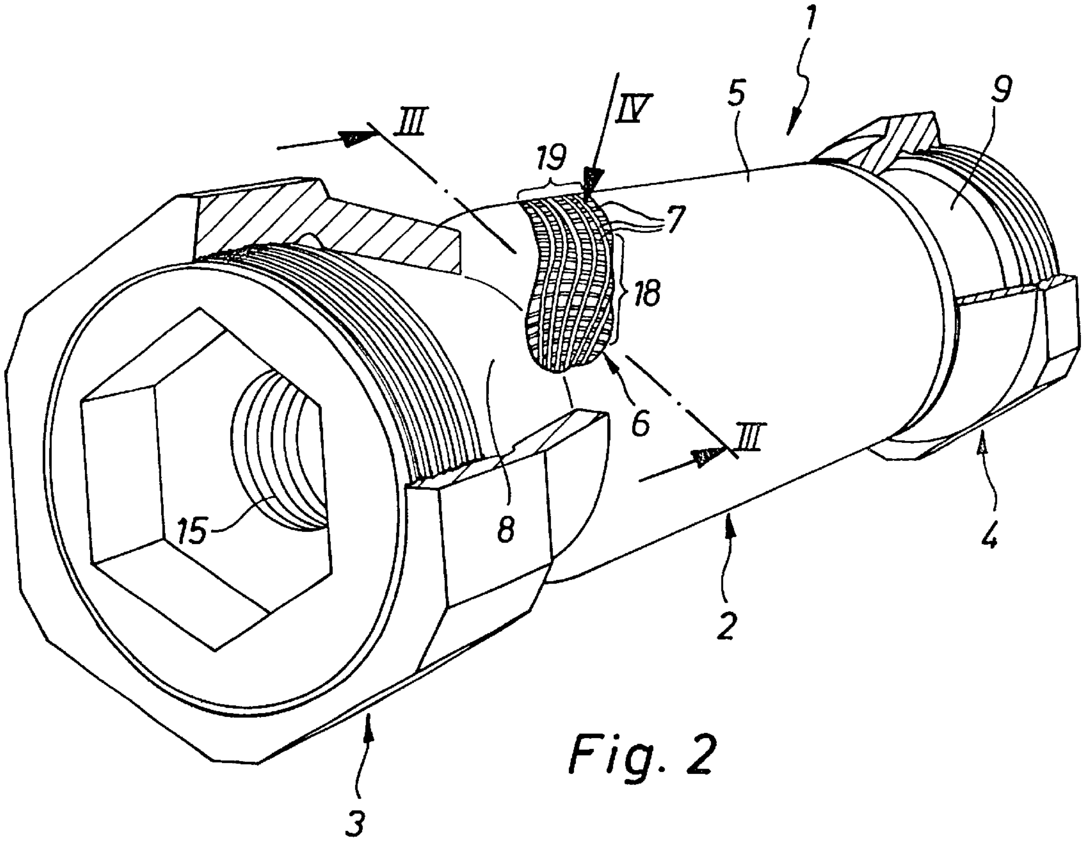
FIG. 2 is a perspective elevation of the actuating means, its contraction means surrounding the hose body and the strand structure being indicated partly broken away.

The actuating means 1 here illustrated comprises a contraction means 2 which in the non activated state assumes a substantially tubular form and extends axially between two spaced head pieces 3 and 4, to which it is secured.

The contraction means 2 includes a hose body 5 of a material with rubber elastic properties, such material being for example rubber itself or an elastomeric means.

Moreover the contraction means 2 includes a strand structure 6 arranged coaxially to the hose body 5 and which comprises a plurality of bendingly flexible strands 7 which simultaneously possess a relatively high tensile strength. These strands 7, although they might consist of plastic material, are in the present working example constituted by individual textile fibers, a multi-fiber structure of the strands also however being possible, consisting for instance respectively of a plurality of individual fiber twisted together.

The strand structure 6 is in the working example completely integrated in the hose body 5. Its individual strands are embedded in the material of the hose body 5 and preferably completely surrounded by the hose material.

At its two axial end regions 8 and 9 the contraction means 2 is fixed to the head pieces 3 and 4 respectively.

Owing to the integrated construction of the contraction means 2 in the working example there is thus a simultaneous fixing in position both of the hose body 5 and also of the strand structure 6. A separate attachment would however also be possible.

The type of attachment is so selected that there is a fluid-tight connection between a respective head piece 3 and 4 and the hose body 5. Furthermore it is important for there to the an extremely tension resistant connection between the strand structure and the head pieces 3 and 4.

This is generally achieved in the working embodiment because the head pieces 3 and 4 are of multi-part design and possess an inner part 12 and furthermore an outer part 13 screwed thereon like a union nut. The inner part 12 has a holding section 14 tapering conically toward the contraction means 2 and on which the contraction means 2 is slipped with a radial spreading thereof. The end sections of the contraction means 2 are then firmly radially clamped between the outer part 13 and the holding section 14.

Attachment means 15 provided on the two head pieces 3 and 4 and for instance in the form of threaded holes, render possible an attachment to components, which are to be shifted in relation to one another. The actuating means 1 may then be employed for instance like a fluid power drive cylinder.

At least one of the head pieces, that is to say the head piece 4 in the present case illustrated in the right hand half of FIG. 1, is provided with a continuous fluid duct 16, which opens on the one hand into the interior space 17 of the hose body 5 and on the other hand is open toward the outer side of the head piece 4. It is provided with connecting means 15, which are for instance constituted directly by the attachment means 15 and render possible the connection of a fluid duct, not illustrated in detail, via which in an alternating manner either a fluid under pressure, as for instance compressed air, or however hydraulic media, may be supplied to the interior space 17 or let off from the interior space 17.

The strands 7 of the strand structure 6 are collected together as two strand groups 18 and 19, which extend in relation to each other in a crossover configuration. This means that there is generally speaking, as viewed in a radial plan view of the strand structure 6, a grid-like configuration with a plurality of rhomb-like regions. If the interior space 17 of the hose body 5 is supplied with a pressure medium, the hose body 5 will increase in diameter (see right hand part of FIG. 1), this causing a deformation of the rhomb grid and, resulting from this, a shortening or contraction of the axial length of the contraction means 2. The head pieces 3 and 4 are thus acted upon by a tension force effective in the axial direction, something which for example may cause a movement together of two components secured to the two head pieces 3 and 4.

The strands 7 within a respective strand group 18 and 19 are preferably placed laterally adjacent to each other and run with an alignment which is the same. The strands 7 of a respective strand group 18 and 19 thus run helically along the periphery of the hose body 5, the crossover configuration being due to the directions of winding of the two strand groups 18 and 19 which are opposite to each other.

Figure 3:
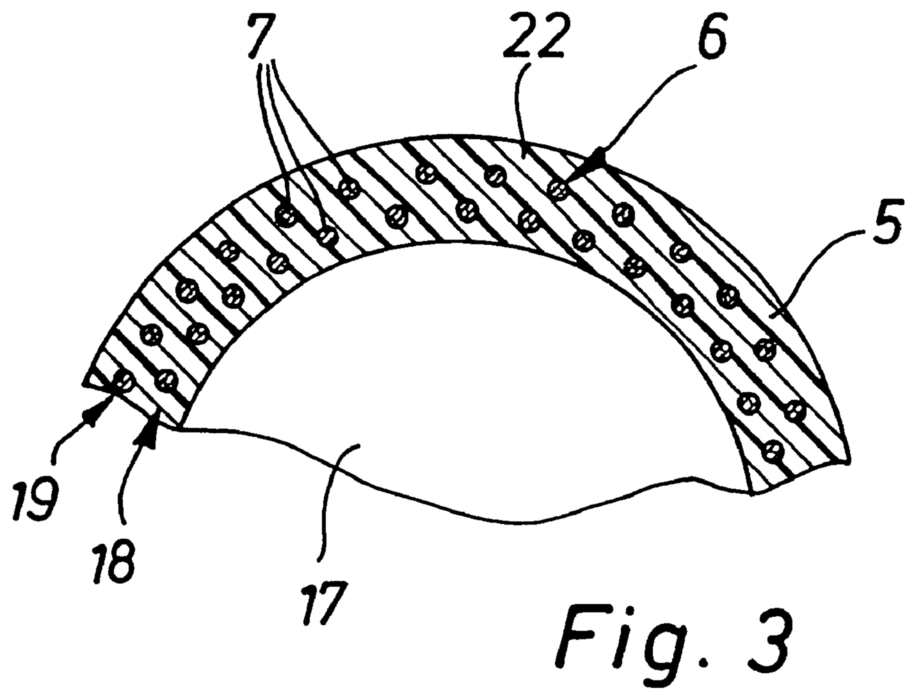
FIG. 3 is a cross section of part of the contraction means of the actuating means on the section line III—III of FIG. 2.
Figure 4:
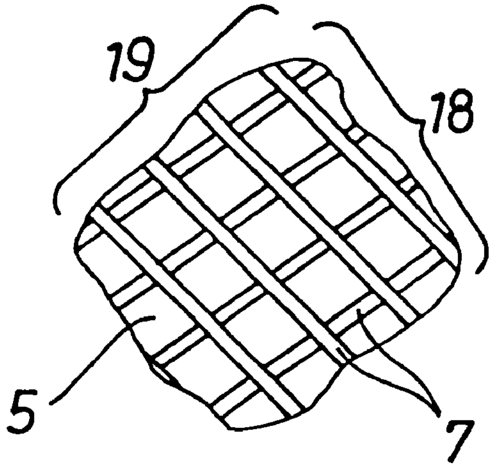
FIG. 4 is a plan view looking radially from the outside toward a section of the strand structure as indicated by the arrow IV of FIG. 2.

In the illustrated working embodiment the two strand groups 18 and 19 are not cross linked with each other and run in two separate tubular layers, which surround each other coaxially. This is made clear by FIG. 3, wherein one inner layer of strands 7 (inner strand group 18) is Concentrically surrounded by a strand layer (outer strand group 19) further to the outside radially.

With such an arrangement it is possible to ensure that the run or course of the strands 7 coincides practically exactly with the principal direction, that is to say in the present case with the helical form, and more especially there is no wave-like course, as is employed in the prior art, where the strands are cross linked with one another and alternatingly run over and under each other.

It is therefore possible to ensure that the individual strands 7 are stretched out even in the non activated state and that the events on stretching during initial activation of the actuating means are only gentle ones. This means that the actuating means 1 possesses an excellent response behavior. Even relatively low fluid pressures will cause a substantial axial tension force.

A further advantage of the actuating means 1 of the embodiment is that the strand groups 18 and 19 are spaced apart by an intermediately placed yielding material 22, which in the following is referred to as the "spacing material". Irrespectively of the respective state of activation of the actuating means 1 direct contact between the individual strands 7 of the two strand groups 18 and 19 is consequently made impossible. In the illustrated working embodiment the same spacing material 22 serves to ensure that the strands 7 belonging to a common strand group 18 and 19 do not touch one another and are in fact spaced apart at all times.

The said spacing material 22 is in the working example of the invention directly constituted by the material of the hose body. This performs the spacer function because the individual strands 7 having the above mentioned configuration are directly and completely embedded in the hose body. As compared with the provision of a separate spacer body of suitably yielding material, which would surround the hose body more particularly coaxially, and in which the strands are embedded, the integrated construction of the working embodiment possesses the advantage of substantially simpler manufacture involving minimum use of material.

All in all the strands 7 are constantly kept apart by the spacing material 22 so that independently of the respective operating state of the actuating means 1 direct contact between the individual strands 7 is out of the question so that in this respect no friction may occur, which would mean premature wear of the individual strands 7. In this respect it will be clear the spacing material 22 in the form of solid material will possess sufficient strength to prevent cutting by the loaded strands 7. Simultaneously however sufficient flexibility is ensured in order to allow for deformation in a radial and axial direction in operation and to give the strands 7 the necessary degrees of freedom.

In this respect rubber material has proved to be most suitable here.

The integration of the strands 7 in the spacing material 22 and, respectively, the material of the hose body may be ensured for example by vulcanizing several layers of such material together using intermediate layers of such material between the individual strand groups 18 and 19.

What is claimed is:

1. An actuating means able to be activated by fluid power, comprising a hose body extending between two spaced head pieces and whose interior space is able to be subjected to a fluid medium, and a strand structure fixed to both head pieces and extending coaxially in relation to the hose body, such strand structure comprising a first and second strand group, each strand group having bendingly flexible strands extending adjacent to one another with the same longitudinal alignment so that the strands within a strand group do not cross over each other, the first strand group being in a crossover configuration with the second strand group and, wherein an intermediately placed yielding material between the first and second strand groups serves to maintain the first and second strand groups constantly at a distance apart.

2. The actuating means as set forth in claim 1, wherein the strand groups are embedded in common in a flexible and preferably rubber elastic material.

3. The actuating means as set forth in claim 1, wherein the material is a rubber material or an elastomeric material.

4. The actuating means as set forth in claim 2, wherein one or both strand groups are completely surrounded by the material.

5. The actuating means as set forth in claim 1, wherein the material maintaining the distance apart is constituted directly by the material of the hose body.

6. The actuating means as set forth in claim 1, wherein the strands run adjacently within one or both strand groups free of contact.

7. An actuating means able to be activated by fluid power, comprising a hose body extending between two spaced head pieces and whose interior space is able to be subjected to a fluid medium, and a strand structure fixed to both head pieces and extending coaxially in relation to the hose body, such strand structure being composed of two strand groups in a crossover configuration with bendingly flexible strands extending adjacent to one another with the same longitudinal alignment within one or both strand groups free of contact, wherein an intermediately placed yielding material between the strand groups serves to maintain the strand groups constantly at a distance apart and, wherein the material arranged between the strand groups preventing contact thereof with each other, is also provided between the strands within the individual strand groups as a spacing means.

8. The actuating means as set forth in claim 1, wherein the strand groups are not cross linked with each other and surround each other coaxially.

9. The actuating means as set forth in claim 7, wherein the strand groups are not cross linked with each other and surround each other coaxially.

* * * * *